United States Patent [19]

Sprouse

[11] Patent Number: 5,166,478
[45] Date of Patent: Nov. 24, 1992

[54] PROTECTIVE SHEATH FOR ELECTRICAL CABLES

[76] Inventor: Kerry Sprouse, P.O. Box 762, East Ely, Nev. 89315

[21] Appl. No.: 712,598

[22] Filed: Jun. 10, 1991

[51] Int. Cl.⁵ .......................................... H01B 17/00
[52] U.S. Cl. ............................. 174/138 F; 439/135; 439/147; 439/504
[58] Field of Search ............... 174/138 F, 5 R, 5 SG; 439/135, 142, 147, 367, 366, 503, 504, 506, 892, 893

[56] References Cited

U.S. PATENT DOCUMENTS 3,517,370  6/1970  Poingt .
3,571,782  3/1971  Colbert et al. .................. 439/367
4,944,685  7/1990  Schulte ........................... 439/135
5,041,000  8/1991  Shotey ............................ 439/367 X Primary Examiner—Leo P. Picard
Assistant Examiner—Trinidad Korka
Attorney, Agent, or Firm—Thorpe, North and Western

[57] ABSTRACT

A protective sheath for insulating a live end of an electrical cable is provided, the sheath comprising a receptacle constructed of insulative material and having interior and exterior portions, the sheath including both open and closed ends, the open end being accessible for insertion of a live end of an electrical cable. The receptacle includes a structure of attaching the receptacle to an electrical cable near a live end thereof. A retainer mounting plate may be provided within the receptacle near the closed end, the mounting plate serving as a point of attachment for the live end of the electrical cable to be protected.

10 Claims, 3 Drawing Sheets

PROTECTIVE SHEATH FOR ELECTRICAL CABLES

BACKGROUND OF THE INVENTION

Field

This invention relates generally to the use of protective casings for insulating standard electrical cable connectors and more specifically to an insulative sheath for encasing a live end of an electrical cable such as a jumper cable.

Electrical cables are used in a variety of different ways in today's society. Commonly, an electrical cable comprises two connectors disposed at opposing ends thereof and an insulative casing to protect the conductive cable itself. Oftentimes, it can be dangerous when one of the connectors of a cable is allowed to lay loosely about while the other connector is coupled to a power source.

This is a particular concern in the context of jumper cables which are used to assist in the starting of a vehicle which has a dead battery or other malfunction of the starter system. As a form of electrical cables, jumper cables comprise a pair of insulated cables with attached connectors used as a temporary connection to transfer energy from a charged battery to a discharged battery.

Due to the large number of motor vehicles which depend upon batteries for engine ignition, the use of jumper cables is very common. Unfortunately, however, inherent dangers of using jumper cables have not been adequately addressed. Further, many of those using jumper cables are not adequately trained in proper safety procedures. As a consequence, many injuries occur to unsuspecting jumper cable users who are unaware of the hazards involved in jump starting a vehicle. For example, statistics show that approximately five percent of the more than 40,000 people who lose their sight annually are the victims of battery explosion accidents. This figure does not take into account the number of people that suffer minor injuries in unreported accidents.

In 1978, a study entitled Battery Explosion Tests and Labeling, Dot Hs-803 665, was completed pursuant to a research contract sponsored by the Federal Department of Transportation. This study was done by the Society of Automotive Engineers, Inc. in concert with a task force made up of persons from the Society of Automotive Engineers (SAE), technical committees on electrical distribution systems, including representatives of manufactures, government and public users. As a part of this study, SAE reviewed and analyzed data regarding reported battery explosion and related accidents which was provided by the U.S. Consumer Product Safety Commission.

The government sponsored study revealed that most explosions are caused by a spark or flame or similar ignition source from outside the battery. According to the report, the ignition source must be placed in an flammable zone of venting hydrogen, which occurs within approximately one to two inches of the point of exit of the gas from the battery's ullage. DOT report, pages 2-13. Upon ignition, the flame propagates into the interior of the battery cell, causing detonation of the contained hydrogen-rich mixture. Battery acid encasement fragments are blown into the face of the unsuspecting victim.

In the typical battery explosion, the igniting shower of sparks is caused by connection of booster cables to the battery terminals. As the circuit is closed by attachment of the terminal, very high currents attempt to bridge the comparatively high resistance area of the contact between the clamp and terminal, thereby causing intense, localized heating. This results in melting and boiling of the mated metallic surfaces, causing white hot, molten metal particles to be ejected. If these fall into the ignition region of the cells, explosion is likely. This condition of molten sparks is much greater when the booster cables are improperly reversed or cross-connected between two twelve volt batteries, as is often done by inexperienced users, thus creating an electrical equivalent of a 24 volt, direct short circuit. The commissioned study revealed that 98.6 percent of the studied battery accidents could be traced to hydrogen gas ignition. Id. pages 2-18.

Responsive to this problem, a number of structures have been developed and marketed wherein an insulative cover or bonnet is provided. For example, applicant is aware of the following U.S. patents, which serve as background references only:

| Inventor | U.S. Pat. No. |
| --- | --- |
| Schulte | 4,944,685 |
| Mueller | 1,965,151 |
| Woodring | 3,853,285 |

The Woodring and Mueller patents disclose insulative covers formed of rubber or other suitable, flexible insulating material which substantially covers the electrical connector at the end of a standard electrical cable. Similarly, the Schulte patent discloses a protective bonnet which, when not in use, may remain attached to the electrical cable to prevent loss thereof. While each of these patents may help somewhat in preventing occurrence of the problem above mentioned—that of hydrogen explosion—there are still problems associated therewith. For example, none of these patents discloses or teaches a structure or method for maintaining two related electrical cable connectors on a standard set of jumper cables in a separated position. Once in a properly separated position, the tendency of jumper cables to spark and ignite as described above, is substantially lowered.

Furthermore, these prior art patents have inadequate structures for maintaining the protective or insulative covering in place over the connector. In the Schulte patent, the connector is held in place within the protector by opposing surfaces pressed together, one surface comprising a hook fastening material and the opposing surface comprising a loop material. The Mueller and Woodring patents disclose insulative bonnets which are maintained over the connector and/or electrical cable associated therewith only by frictional means. Whether the protector or bonnet is held in place about the electrical connector by frictional or hook and loop means, there remains a substantial danger that the protector or bonnet will become dislodged, thereby leaving the electrical connector exposed.

Therefore, there exists in the art a legitimate need for a protective covering for electrical connectors, specifically for use with standard jumper cables, which 1) protect and insulate the electrical connector, 2) provide a means for securing the electrical connector within the covering, thereby minimizing the risk of the electrical connector becoming dislodged from the covering, and 3) maintain the electrical connectors of two separate cables which makeup a standard set of jumper cables in a separated position to minimize the risk of hydrogen explosion.

BRIEF SUMMARY AND OBJECTS OF THE INVENTION

Accordingly, it is a principal object of this invention to provide a protective sheath for jumper cables which prevents two live electrical connector ends thereof from contacting each other to cause sparks and/or explosions.

It is a further object of this invention to provide an insulative sheath which includes a structure for maintaining a live connector end therein, thereby minimizing risk of dislodging the live connector end.

It is still another object of this invention to provide a jumper cable protective sheath which includes a structure by which the sheath can be attached to one of the cables near a live end thereof.

It is yet another object to provide a jumper cable protector sheath which is lightweight, simple to use, inexpensive, easy to store, durable, efficient, and cost effective.

These and other objects are realized in a preferred protective sheath for electrical cables, according to the invention, which comprises a receptacle constructed of an insulative material and having interior and exterior portions, the receptacle including a permanently closed end and open end, the open end being accessible for insertion of a live end of an electrical cable; and an attachment structure for connecting the sheath to an electrical cable near a live end thereof, the attachment structure being connected to the exterior of the receptacle.

Advantageously, the sheath further includes a retainer mounting plate mounted within the receptacle near the permanently closed end, the mounting plate serving to secure the live end (preferably an alligator clip) of the cable inserted in the receptacle. Alternatively, the live end to be inserted is a stereo jack, in which case the retainer mounting plate is not included.

DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
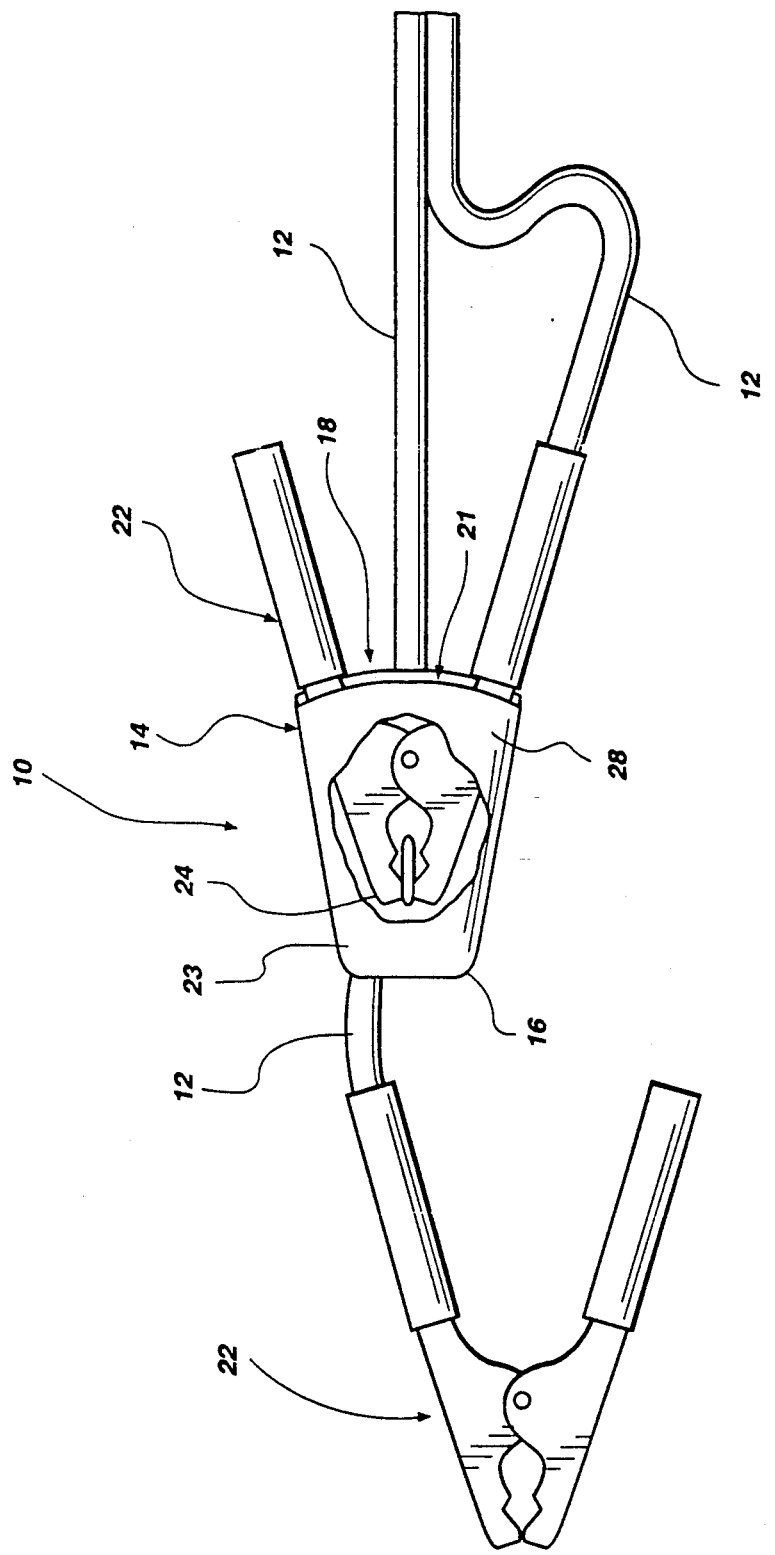
FIG. 1 is a side elevational view, in partial cut-away, of the present invention, shown attached to a set of jumper cables and having one of the live ends inserted thereinto.

Reference is now made to the drawings wherein like numerals are used to denote like components throughout. A protective sheath, generally designated 10, for insulating a live end of an electrical cable 12, according to the present invention, comprises a receptacle 14 constructed of insulative material and having a permanently closed end 16 and an open end 18 which is accessible for insertion of a live end of an electrical cable 12, and an attachment structure 20 for attaching the sheath 10 to an electrical cable 12 near a live end thereof. Each of these components is more fully described hereinafter.

As shown in FIG. 1, the preferred embodiment of the invention is best used in connection with a set of standard jumper cables having alligator clips 22 disposed at each of the ends thereof. The alligator clips 22, as is well known in the art, are used as electrically conductive connectors. Usually, alligator clips 22 are biased in a closed position by a spring, not shown, or other standard biasing implement.

FIG. 1 illustrates the preferred method of using the sheath 10. The sheath 10 is releasably connected to one of the cables 12 by means hereinafter explained in greater detail, while the alligator clip 22 connected to the opposing electrical cable 12 of the jumper cable set is inserted into the open end 18 of the receptacle 14. In this manner, the two alligator clips 22 shown in FIG. 1 are prevented from contacting each other while the sheath 10 is in use. This prevents or substantially minimizes sparking and the risk of hydrogen explosion, as indicated above.

Figure 2:
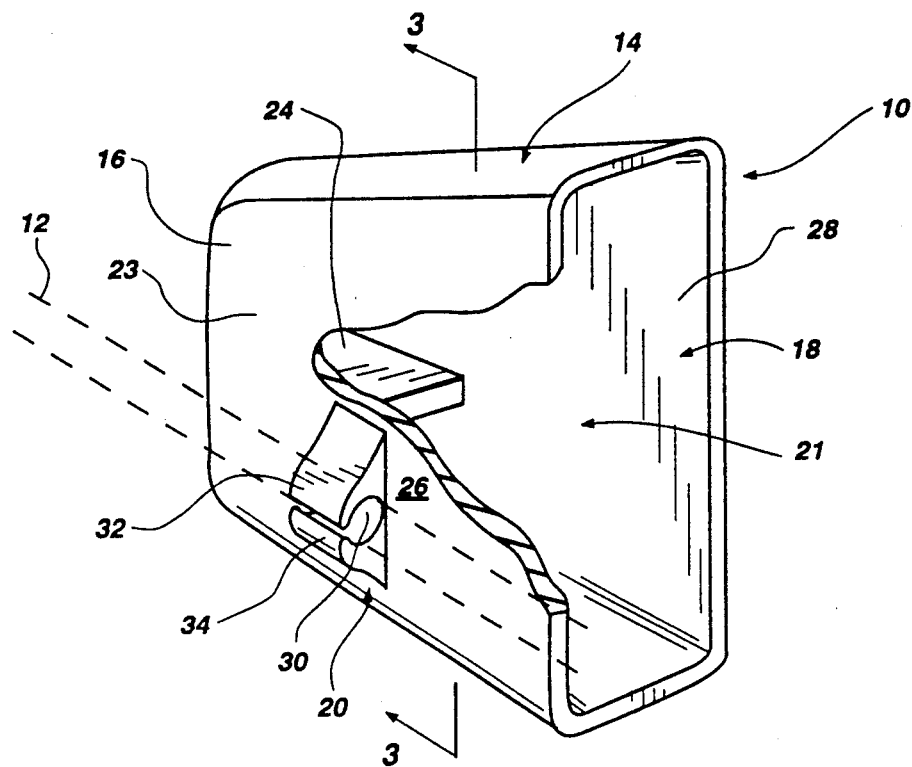
FIG. 2 is an enlarged rear perspective view, with partial cut-away, of the invention of FIG. 1.

As mentioned, the receptacle 14, best illustrated in FIG. 2, is constructed of an insulative material such as plastic or rubber. Advantageously, the receptacle 14 possesses some structural integrity to provide increased protection to the live cable end inserted therein. A hardened plastic is presently preferred over other materials, although it will be recognized by one skilled in the art that any number of nonconducting materials would fall within the scope of this invention.

Importantly, the receptacle 14 has one permanently closed end 16 and one open end 18 into which the live end of the cable 12 is inserted, the receptacle thus forming an interior portion 21 and an exterior portion 23. When used with a standard set of jumper cables, the receptacle 14 has a trapezoidal configuration which tapers from the open end 18 to the permanently closed end 16 to substantially conform to the shape of the alligator clip 22. One skilled in the art will recognize that the shape of the receptacle 14 is best determined by the general shape of the live cable end to be inserted therein.

Figure 3:
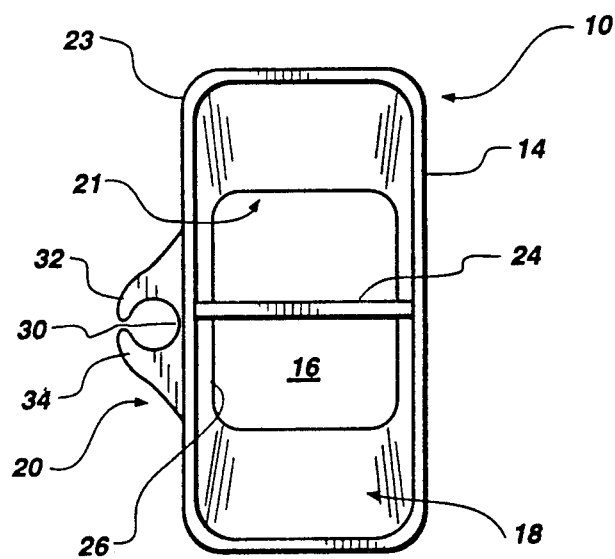
FIG. 3 is an enlarged rear elevational view of the invention of FIG. 1 taken along the lines 3—3 of FIG. 2.

Referring now to FIGS. 2 and 3, the protective sheath 10 further comprises a retainer mounting plate 24 mounted within the receptacle 14 in the interior portion 21 thereof near the closed end 16. Retainer mounting plate 24 serves as a structure by which the alligator clip 22 to be inserted into receptacle 14 is secured within the interior portion 21 of the receptacle 14. The jaws of the alligator clip 22 are braced in a closed position about the mounting plate 24 to secure the clip 22 in place therein.

In the preferred embodiment, the retainer mounting plate 24 is constructed of a metallic strip, although other similar structural materials which can be easily mounted in the interior portion 21 also fall within the scope of this invention. As illustrated, one end of retainer mounting plate 24 is securely attached to a sidewall 26 of receptacle 14, while the opposing end thereof is securely attached to the opposing sidewall 28.

The attachment structure 20 is best illustrated in FIGS. 2 and 3. The attachment structure 20, as will be appreciated, serves as a means for connecting the sheath 10 to an electrical cable 12. Advantageously, the attachment is made near a live end of the cable 12 to which it is attached.

Attachment structure 20 may be formed integrally with the exterior portion 23 of the receptacle 14, preferably on sidewall 26, or may be separately connected thereto, whichever is most convenient. The attachment structure 20 is preferably constructed of a flexible but supportive material such as a hardened rubber or plastic. The structure 20 includes a channel 30 sized and shaped for receipt of an electrical cable 12, and a plurality, preferably two, of curved fingers 32 and 34. The fingers 32 and 34, as shown, combine to secure the electrical cable 12 within the channel 30 and, when separated, provide access into the channel 30 by a cable 12. The fingers 32 and 34 may be formed of a hardened plastic, in which case the cable 12 snaps in and out of the channel 30, or, in the alternative, may be formed of a softer rubber or similar synthetic material. Other known means for attaching a cable 12 to the receptacle 14 which are known in the art may be substituted for the attachment structure 20 shown without departing from the scope of this invention.

Figure 4:
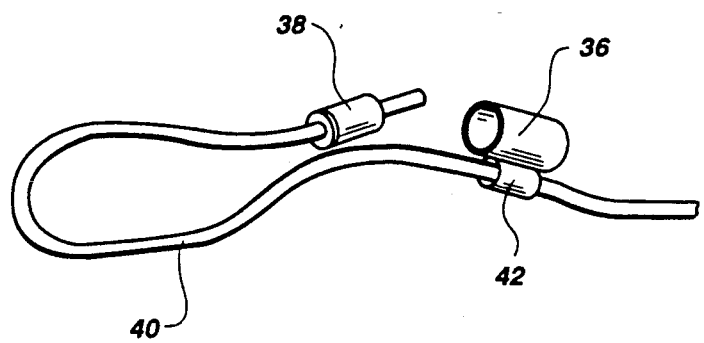
FIG. 4 is a second preferred embodiment of the present invention wherein a standard stereo jack is used in place of jumper cables.

Referring now to FIG. 4, an alternative embodiment of the present invention is illustrated. Therein is shown a receptacle 36 into which a conventional stereo jack 38, often known as an RCA jack, is inserted for protection. The stereo jack 38 represents the live end of an electrical cable 40 onto which the receptacle 36 is attached. An attachment structure 42 temporarily attaches the receptacle 36 to the electrical cable 40. As shown, the receptacle 36 has a generally cylindrical shape to better receive the jack 38. In this embodiment, the retainer mounting plate 24 is excluded and thus the jack 38 is held within the receptacle 36 by frictional means. As demonstrated, this embodiment uses the same principles as the above described embodiment of the invention to accomplish the same task; however, rather than using a clamp having an alligator clip 22, the device 10 has been adapted to receive a standard stereo jack 38 as described.

While the invention has been described and illustrated in conjunction with the best currently known embodiments, it will become apparent to those skilled in the art that modifications and variations may be made without departing from the spirit of the invention as disclosed and the scope thereof as set forth in the following claims.

I claim:

1. A protective sheath for insulating a live end of at least one electrical cable, the sheath comprising
   a receptacle constructed of insulative material and having interior and exterior portions, the receptacle including a permanently closed stopping end, which is closed by the insulative material of the receptacle, and an open entrance end which is accessible for insertion of a first live end of an electrical cable into the interior portion, and
   exterior attachment means for connecting the sheath to an electrical cable near a second live end thereof, the attachment means being connected to the exterior portion of the receptacle.

2. A protective sheath as in claim 1 wherein the first live end of the electrical cable for insertion into the interior portion of the receptacle is an alligator clip.

3. A protective sheath as in claim 2 further comprising a retainer mounting plate mounted in the interior portion of the receptacle on a line approximately bisecting the closed stopping end and extending directly toward the open entrance end, the retainer mounting plate serving to secure the alligator clip within the interior portion of the receptacle by bracing the jaws of the alligator clip in a closed position about the mounting plate.

4. A protective sheath as in claim 1 wherein the exterior attachment means is formed integrally with the receptacle.

5. A protective sheath as in claim 2 wherein the receptacle has a trapezoid configuration which tapers from the open entrance end to the closed stopping end to substantially conform to the shape of the alligator clip.

6. A protective sheath as in claim wherein the exterior attachment means comprises a flexible structure which includes
   a channel for receipt of an electrical cable, and
   a plurality of curved fingers for securing the electrical cable within the channel.

7. A protective sheath as in claim 1 wherein first the live end of an electrical cable is a stereo jack.

8. A protective sheath as in claim 1 wherein the insulative material from which the receptacle is constructed is a hardened plastic.

9. A protective sheath as in claim 1 wherein the attachment means is constructed of hardened plastic.

10. An apparatus for preventing electric shock or short-circuit in the handling of automobile jumper cables comprising:
   a pair of jumper cables, each having first and second opposing ends each comprising an alligator jaw clamp;
   a sheath constructed of hardened plastic having first, second, third, and fourth generally flat sides, the first and third sides having a generally trapezoidal shape and the second and fourth sides naving a generally rectangular shape, the sheath also having a closed stopping end at the narrow ends of the trapezoids and an open entrance end at the wide ends of the trapezoids for the insertion of an alligator jaw clamp, thereby forming an interior cavity;
   a plate mounted on the stopping end of the sheath and extending into the interior cavity generally perpendicular to the closed end and the first and third sides, adapted for the securing of an alligator jaw clamp thereon by clamping the opposing jaws of the clamp on opposite sides of the plate;
   exterior attachment means mounted on the exterior surface of a side of the sheath for attachment of the sheath to an jumper cable.

* * * * *